United States Patent
Chisty et al.

(10) Patent No.: US 9,948,787 B2
(45) Date of Patent: Apr. 17, 2018

(54) VOIP VOICE AND MESSAGING APPLICATION

(71) Applicant: Invariant Telecom, Milford, DE (US)

(72) Inventors: S Md Jashimuddin Chisty, Dacca (BD); Saad Ahmed, Dacca (BD)

(73) Assignee: Invariant Telecom, LLC, Milford, DE (US)

( * ) Notice: Subject to any disclaimer, the term of this patent is extended or adjusted under 35 U.S.C. 154(b) by 175 days.

(21) Appl. No.: 14/982,261

(22) Filed: Dec. 29, 2015

(65) Prior Publication Data

US 2016/0119483 A1    Apr. 28, 2016

Related U.S. Application Data

(63) Continuation-in-part of application No. 14/748,083, filed on Jun. 23, 2015, now abandoned.

(60) Provisional application No. 62/015,830, filed on Jun. 23, 2014.

(51) Int. Cl.
| | |
|---|---|
| *H04W 80/04* | (2009.01) |
| *H04M 7/00* | (2006.01) |
| *H04W 4/20* | (2018.01) |
| *H04W 4/16* | (2009.01) |
| *H04M 1/253* | (2006.01) |
| *H04M 1/725* | (2006.01) |

(52) U.S. Cl.
CPC ....... *H04M 7/0021* (2013.01); *H04M 1/2535* (2013.01); *H04M 1/72522* (2013.01); *H04M 1/72552* (2013.01); *H04M 1/72583* (2013.01); *H04W 4/16* (2013.01); *H04W 4/203* (2013.01); *H04M 2250/62* (2013.01)

(58) Field of Classification Search
CPC ...... H04M 7/0021; H04W 4/203; H04W 4/16
See application file for complete search history.

(56) References Cited

U.S. PATENT DOCUMENTS

| | | | |
|---|---|---|---|
| 2006/0286980 A1* | 12/2006 | Hua | H04W 60/00 455/435.1 |
| 2007/0066344 A1 | 3/2007 | Pi et al. | |
| 2007/0077932 A1 | 4/2007 | Pi et al. | |
| 2008/0056235 A1* | 3/2008 | Albina | H04M 7/123 370/352 |
| 2010/0048192 A1* | 2/2010 | Jones | H04M 1/274516 455/418 |
| 2010/0069054 A1 | 3/2010 | Labidi et al. | |

(Continued)

OTHER PUBLICATIONS

Lakeram Jangbahadur, "Non-Final Office Action" dated Mar. 16, 2016 for U.S. Appl. No. 14/748,083.

*Primary Examiner* — Andrew Lee
(74) *Attorney, Agent, or Firm* — LeonardPatel PC; Michael Aristo Leonard, II; Sheetal Suresh Patel

(57) ABSTRACT

A software application enables a mobile device to make and receive voice calls, video calls, and text messages over a data network using VoIP. The application may run in the background and intercept outgoing and incoming calls. When the outgoing or incoming call is to/from another user of the application, the application may launch an appropriate screen and make/receive the call or text via Voice-over-Internet Protocol (VoIP). Otherwise, the call or text functionality may be performed by native functionality of the mobile device via a GSM network.

17 Claims, 20 Drawing Sheets

(56) References Cited

U.S. PATENT DOCUMENTS

| | | | |
|---|---|---|---|
| 2010/0158230 A1* | 6/2010 | Dhawan | H04M 1/2478 379/201.02 |
| 2011/0216759 A1* | 9/2011 | Qian | H04L 65/1063 370/352 |
| 2012/0197967 A1* | 8/2012 | Sivavakeesar | G06Q 50/01 709/203 |
| 2014/0106720 A1* | 4/2014 | Mairs | H04M 3/42102 455/415 |
| 2014/0310337 A1* | 10/2014 | Kim | G06Q 10/10 709/203 |
| 2014/0321417 A1* | 10/2014 | Yang | H04L 65/1046 370/329 |
| 2015/0092612 A1* | 4/2015 | Zhu | H04L 65/1046 370/259 |
| 2015/0099550 A1* | 4/2015 | Alharayeri | H04L 51/00 455/456.3 |
| 2015/0296081 A1* | 10/2015 | Jeong | H04M 3/4365 379/142.01 |
| 2015/0351074 A1* | 12/2015 | Vyas | H04W 68/005 455/414.2 |

* cited by examiner

VOIP VOICE AND MESSAGING APPLICATION

CROSS-REFERENCE TO RELATED APPLICATIONS

This application is a continuation-in-part of U.S. patent application Ser. No. 14/748,083 filed on Jun. 23, 2015, which claims the benefit of U.S. Provisional Application Ser. No. 62/015,830 filed on Jun. 23, 2014. The subject matter of these earlier filed applications is hereby incorporated by reference in its entirety.

FIELD

The present invention generally relates to telephony, and more particularly, to a software application that enables a mobile device to make and receive voice calls, video calls, and text messages over a data network using Voice-over-Internet Protocol (VoIP) when an outgoing or incoming call to another application user is detected.

BACKGROUND

Various companies offer third-party applications for smart phones and other mobile devices that allow voice and video conferencing using VoIP. Some of these companies include Skype™, Viber™, Google Hangouts™, and Vonage™. The user downloads the application, which connects with a VoIP server. The VoIP application requires the user to import the mobile device's contact list to that VoIP application's address book. The VoIP application then tells the user who else is presently using that VoIP application and who is presently connected and available to communicate. The VoIP application's address book and the smart phone's contacts list can also be synchronized. However, downloading applications introduces the risk of downloading viruses or other malware, and applications consume power, memory, and Internet bandwidth. Also, the phone hangs up, downloads cookies, and uses device storage, which reduces the speed of the mobile device's operating system (OS). Further, many applications expose the user to advertising.

Additionally, even after downloading a third-party application, the user must follow a cumbersome process in order to configure the smart phone to make VoIP calls. For example, with or without the VoIP application on mobile devices, the user must go to a profile setup for Skype™ to connect, for example, and on the Skype™ Session Initiation Protocol (SIP) profiles page, the user must setup a SIP user account (possibly requiring a subscription or pay-as-you-go service) from a VoIP service provider such as Skype™ or Viber™ to get a SIP address as a SIP client. Smart phone and Wi-Fi enabled mobile phones may have SIP clients preinstalled with the operating system (OS) or available as an application download.

To setup a SIP address on a computer or mobile device, similar to creating an email account with Google™ or Yahoo™, the user needs to configure the SIP client by filling the required fields, a new username and password, a display name, a domain, and a domain proxy. The user then provides the SIP addresses to others who also use the same SIP (the SIP addresses are shared just like phone numbers to make VoIP calls).

When the caller wishes to make a VoIP or video call to a recipient, the caller must be connected to the VoIP server so the VoIP server can assign a dynamic IP address to the caller. Further, the recipient must also be connected to the VoIP server, so the VoIP server also has the recipient's dynamic IP address. Because the VoIP server has both the caller's and the recipient's dynamic IP addresses, the VoIP call can be sent and received. However, if either the caller or the recipient is not connected to the VoIP server, the voice or video call cannot be placed because the VoIP server will not have the IP address of the unconnected party. Thus, in order to assure receipt of voice and video calls, users and recipients must remain connected to the VoIP server at all times if they wish to make or receive voice or video calls.

However, this requires that the VoIP application be running on the smart phone during these times, which consumes computer memory, battery power, and Internet bandwidth, causes phone hang-ups (and sometimes needs to restart), interrupts phone conversations or terminates phone calls, and exposes the user to advertisements while the VoIP application is running. Accordingly, an improved application may be beneficial.

SUMMARY

Certain embodiments of the present invention may provide solutions to the problems and needs in the art that have not yet been fully identified, appreciated, or solved by current VoIP technologies. For example, some embodiments pertain to a software application that enables a mobile device to make and receive voice calls, video calls, and text messages over a data network using VoIP. The application may run in the background and intercept outgoing and incoming calls. When the outgoing or incoming call is to/from another user of the application, the application may launch an appropriate screen and make/receive the call or text via Voice-over-Internet Protocol (VoIP). Otherwise, the call or text functionality may be performed by native functionality of the mobile device via a GSM network.

In an embodiment, an apparatus includes memory storing computer program instructions for a broadcast receiver and a background service listener and at least one processor configured to execute the computer program instructions. The broadcast receiver is configured to cause the at least one processor to receive a broadcast from an operating system of the apparatus indicating that an outgoing call is being made and intercept the outgoing call. The broadcast receiver is also configured to cause the at least one processor to check whether a recipient of the outgoing call is a registered user of an application associated with the broadcast receiver. The broadcast receiver is further configured to cause the at least one processor to launch an outgoing call user interface of the application when the recipient is a registered user of the application, and launch a native call user interface of the mobile device when the recipient is not a registered user of the application. The background service listener is configured to cause the at least one processor to listen for an incoming call notification from one or more servers indicating that the incoming call is from a registered user of the application. The background service listener is also configured to cause the at least one processor to launch an incoming call user interface of the application when the incoming call notification is received.

In another embodiment, a computer-implemented method includes receiving, by a software application running on a mobile device, a broadcast from an operating system of the mobile device indicating that an outgoing call is being made. The computer-implemented method also includes intercepting the outgoing call, by the application. The computer-implemented method further includes checking, by the application, whether a recipient of the outgoing call is a registered user of the application, and launching an application outgoing call user interface, by the application, when the recipient is a registered user of the application.

In yet another embodiment, a computer program is embodied on a non-transitory computer-readable medium. The program is configured to cause at least one processor to intercept an outgoing call responsive to a broadcast from an operating system of a mobile device indicating that the outgoing call is being made. The computer program is also configured to cause the at least one processor to check whether a recipient of the outgoing call is a registered user of an application and launch an outgoing call user interface of the application when the recipient is a registered user of the application.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a software application that enables a mobile device to make and receive voice calls, video calls, and text messages over a data network using VoIP. The application may run in the background and intercept outgoing and incoming calls. When the outgoing or incoming call is to/from another user of the application, the application may launch an appropriate screen and make/receive the call or text via Voice-over-Internet Protocol (VoIP). Otherwise, the call or text functionality may be performed by native functionality of the mobile device via a GSM network.

With this functionality, the user does not need to launch the application to send and receive calls. Also, the user does not need to search for whether a contact has the application, or check whether a contact has newly installed or uninstalled the application since the last call. Rather, the application may run seamlessly in the background of the mobile device, taking advantage of VoIP when possible to place and receive calls and text messages.

Figure 1:
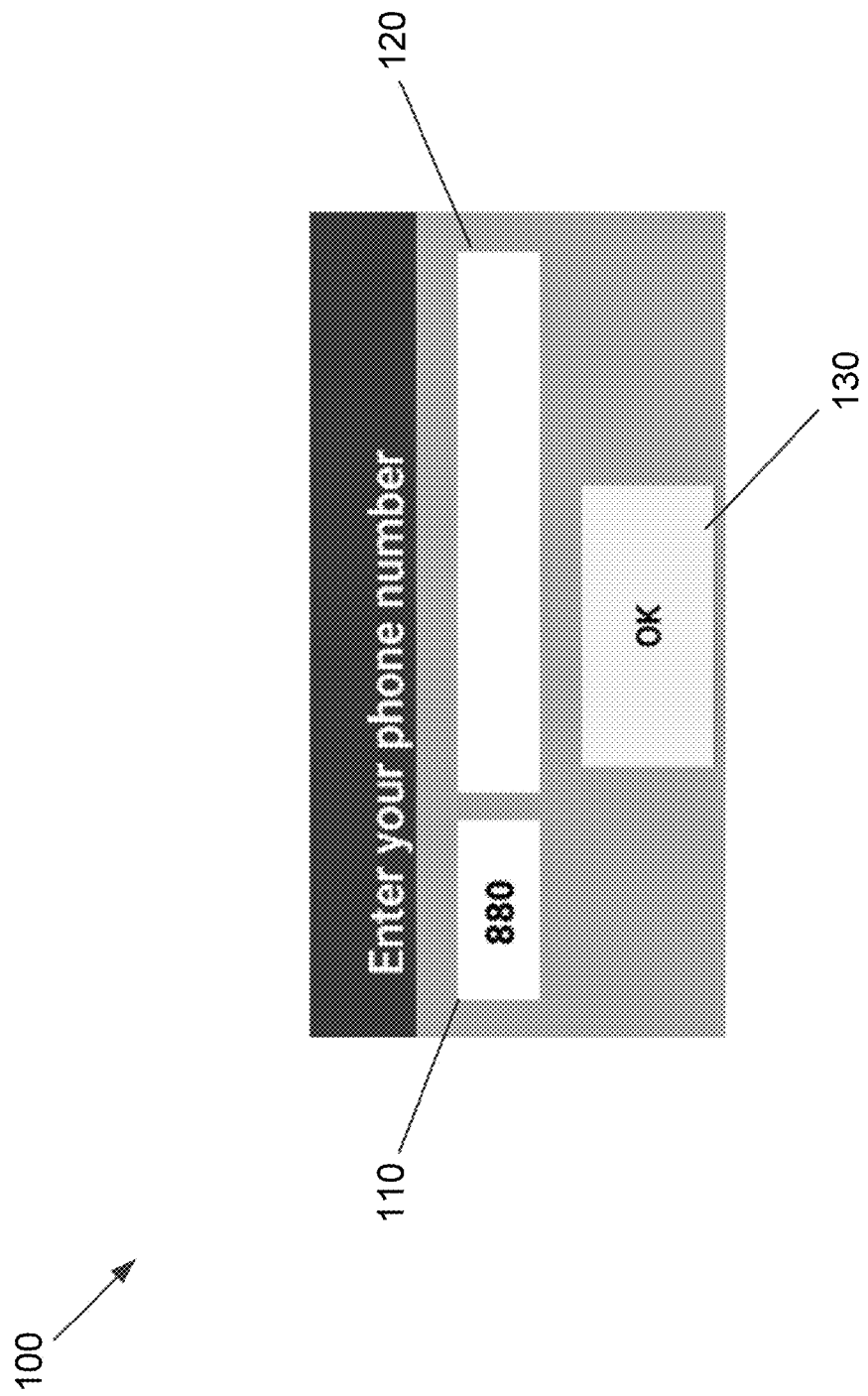
FIG. 1 is a screenshot illustrating an initial registration screen, according to an embodiment of the present invention.

FIG. 1 is a screenshot illustrating an initial registration screen 100, according to an embodiment of the present invention. Initial registration screen 100 includes an area code text field 110 and a phone number text field 120 that allow a user to enter a phone number. An "OK" button 130 provides functionality to submit the phone number entered by the user for registration.

Figure 2:
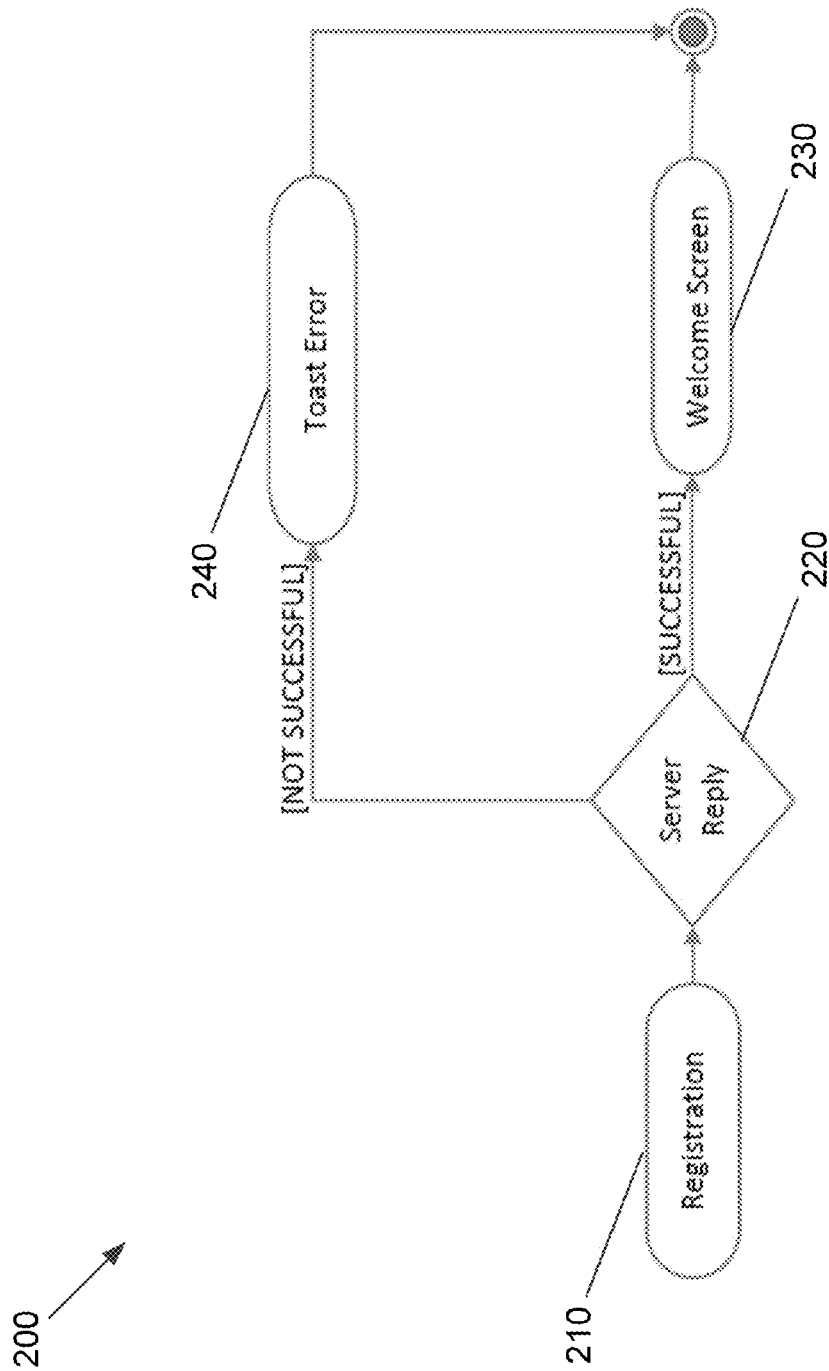
FIG. 2 is a flowchart illustrating a process for registering a user, according to an embodiment of the present invention.

FIG. 2 is a flowchart 200 illustrating a process for registering a user, according to an embodiment of the present invention. The application presents the user with a number registration screen, such as initial registration screen 100 illustrated in FIG. 1. The process begins with the user submitting a number for registration at 210 when the user first installs the VoIP application, such as the Telvo™ application. After the user enters his or her number, the application sends a request to a back-end server for registration. If the registration is successful, the server replies that the registration was successful at 220, and the application displays a welcome screen at 230, such as welcome screen 300 of FIG. 3. If the registration failed, the server replies that the registration was unsuccessful at 220 and the application displays an error message at 240. For instance, in Android™, the simplest way to display error messages to users is via a "Toast." However, any suitable error mechanism may be used without deviating from the scope of the invention.

Figure 3:
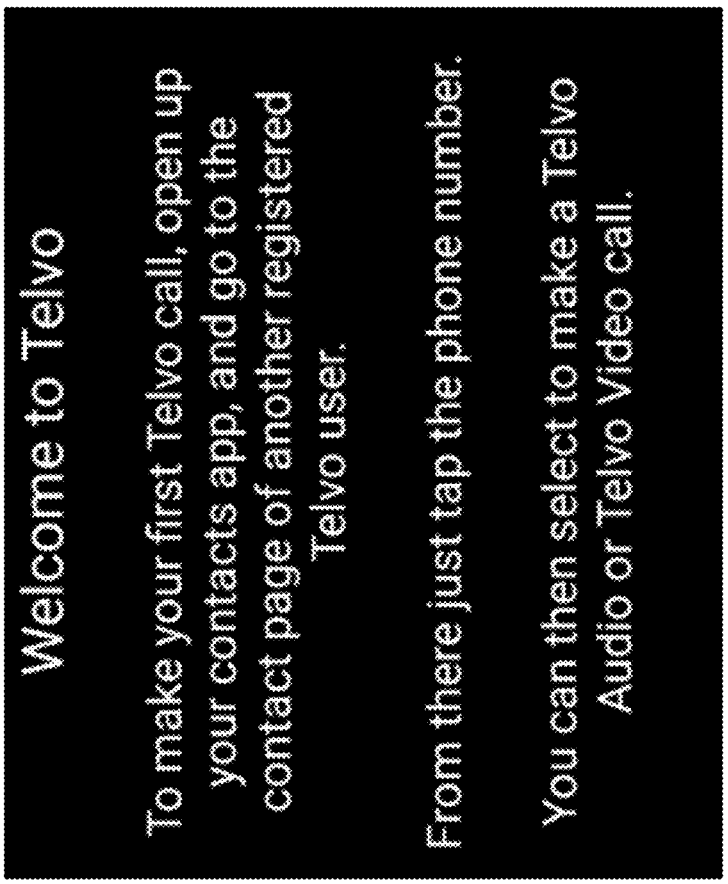
FIG. 3 is a screenshot illustrating a welcome screen, according to an embodiment of the present invention.

FIG. 3 is a screenshot illustrating a welcome screen 300, according to an embodiment of the present invention. Welcome screen 300 welcomes the user to the Telvo™ application in this embodiment and provides some basic instructions. In this embodiment, welcome screen 300 informs the user how to find registered Telvo™ users, how to make a call, and how to select the call type.

Figure 4:
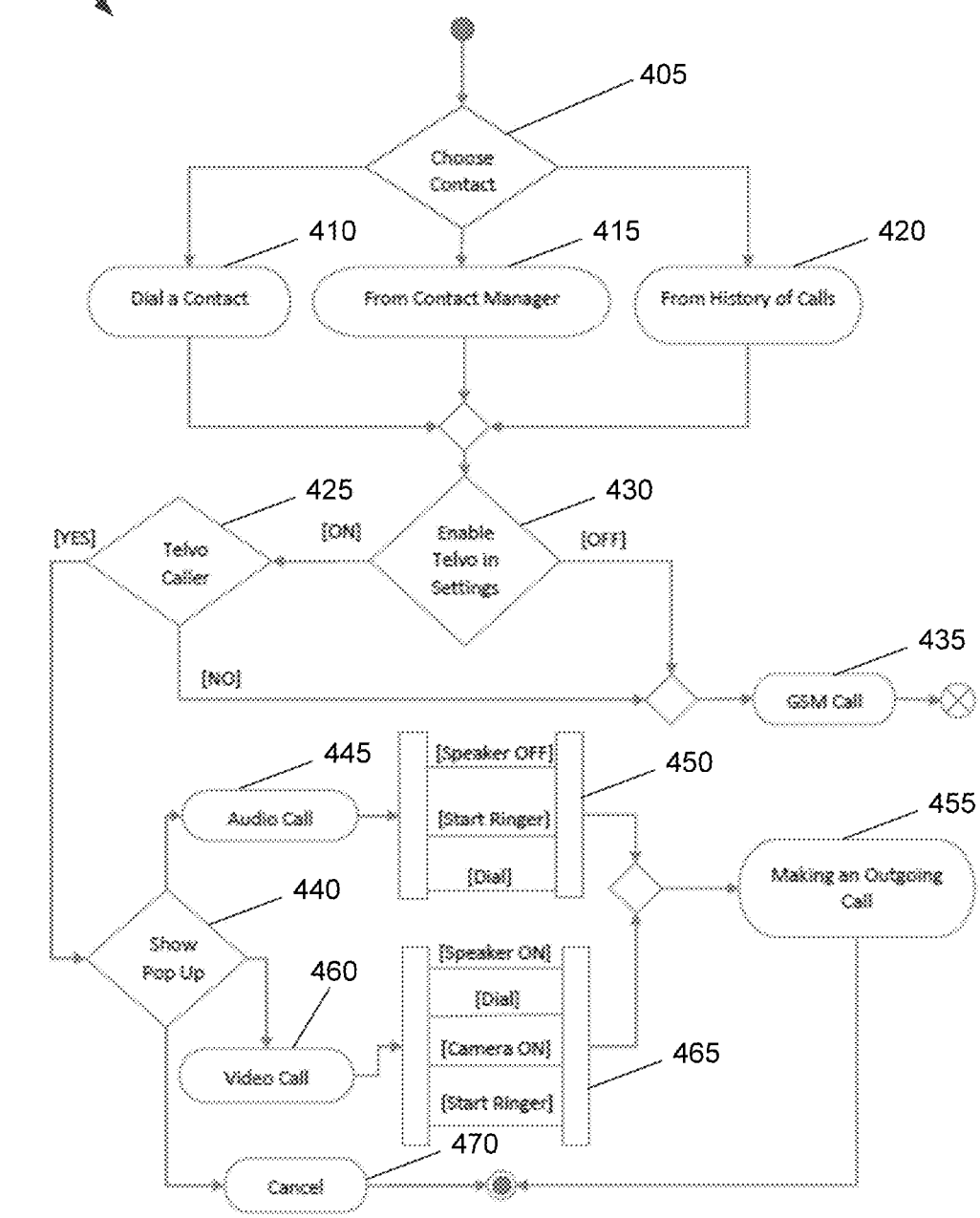
FIG. 4 is a flowchart illustrating a process for making an outgoing call, according to an embodiment of the present invention.

FIG. 4 is a flowchart 400 illustrating a process for making an outgoing call, according to an embodiment of the present invention. To make a call, the user first chooses a recipient for the outgoing call at 405. This can be done in one of three ways: (1) directly dialing the recipient's number in the keypad at 410; (2) selecting the recipient from a contact manager application on the phone at 415; or (3) selecting the recipient from a call history list at 420.

If calls are enabled in the Telvo™ application at 430, the application will intercept the call and check whether the recipient user is also a registered Telvo™ user at 430. If the recipient is not a Telvo™ user, a GSM call will be placed at 435 using a regular GSM cellular network. If the recipient is a registered Telvo™ user, a pop-up dialog is displayed that presents the user with the option of making an audio call, making a video call, or cancelling the request. In some embodiments, the popup dialog may be popup dialog 500 of FIG. 5. Depending on the user's selection, the appropriate type of call interface will be launched, and the call will be connected.

If the user chooses to make an audio call at 445 or a video call at 460, the appropriate actions are taken at 450 or 465, respectively. For instance, for an audio call in this embodiment, the speaker is turned off, the ringer is started, and the application begins to dial the number at 450. For video calls, the speaker and camera are turned on at 465. The outgoing call is then made at 455. If the user chooses to cancel at 470, then no calls will be made.

Figure 5:
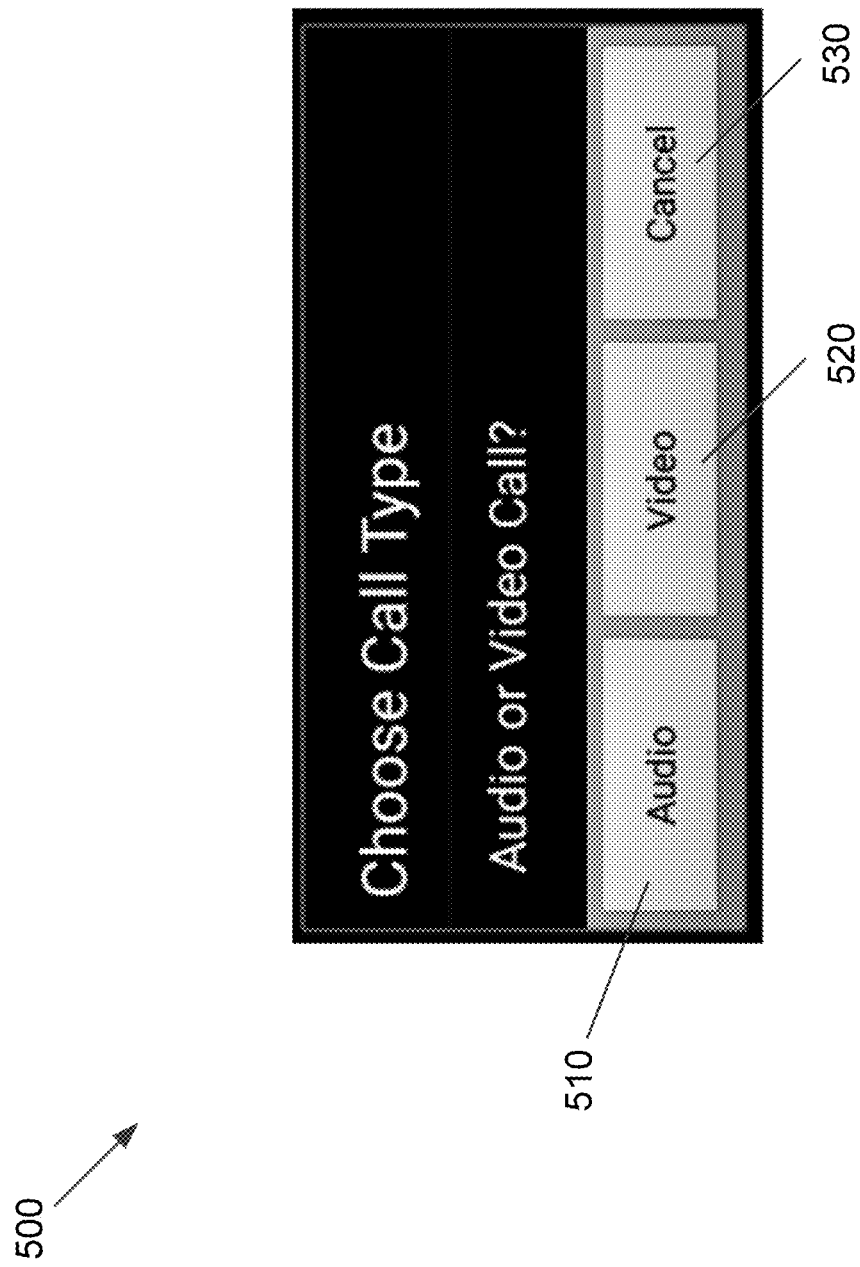
FIG. 5 is a screenshot illustrating a popup dialog for selecting a call type, according to an embodiment of the present invention.

FIG. 5 is a screenshot illustrating a popup dialog 500 for selecting a call type, according to an embodiment of the present invention. Popup dialog 500 asks the user what call type he or she would like to make. The user may then select audio button 510, video button 520, or cancel button 530.

Figure 6:
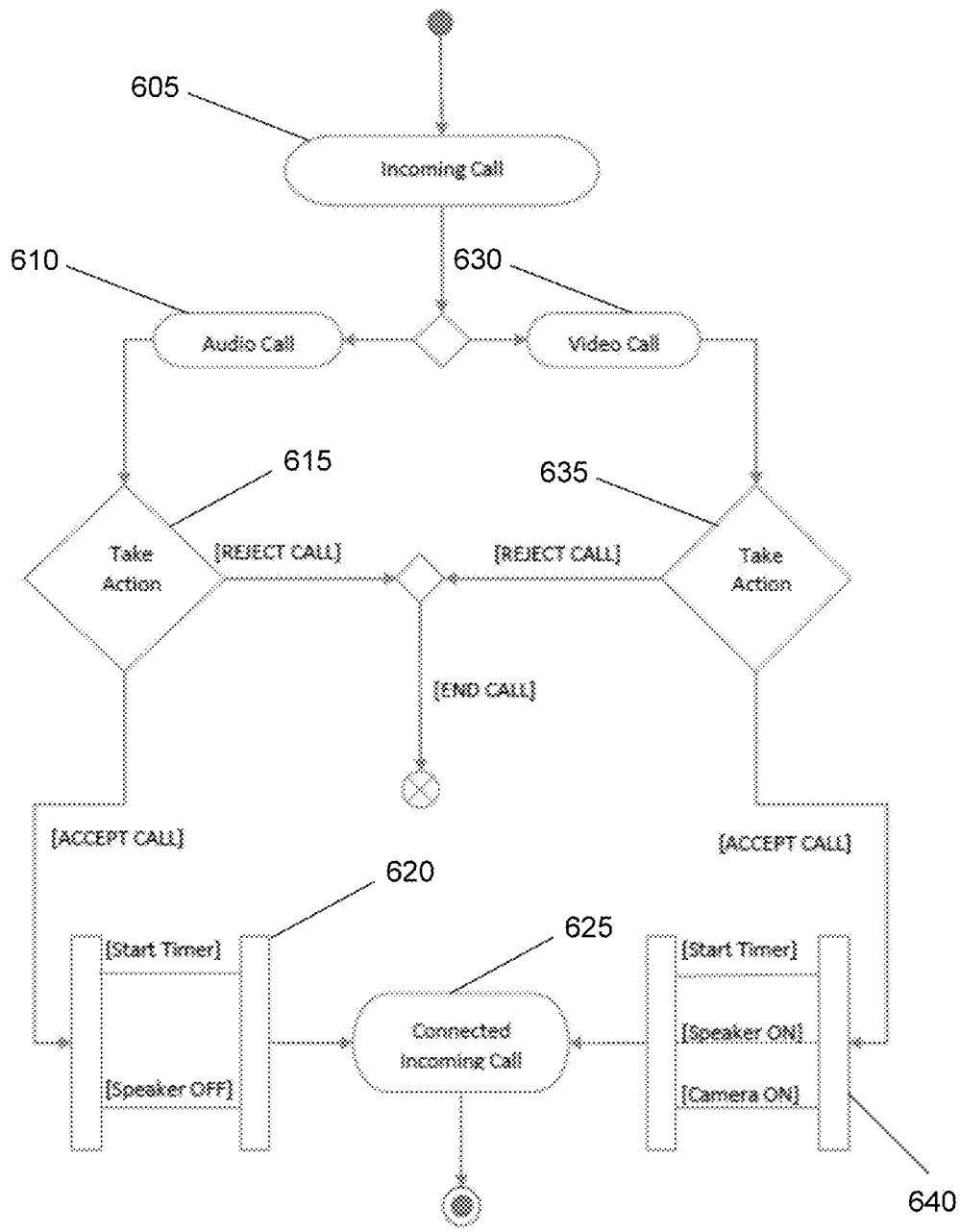
FIG. 6 is a flowchart illustrating a process for receiving an incoming call, according to an embodiment of the present invention.
Figure 7:
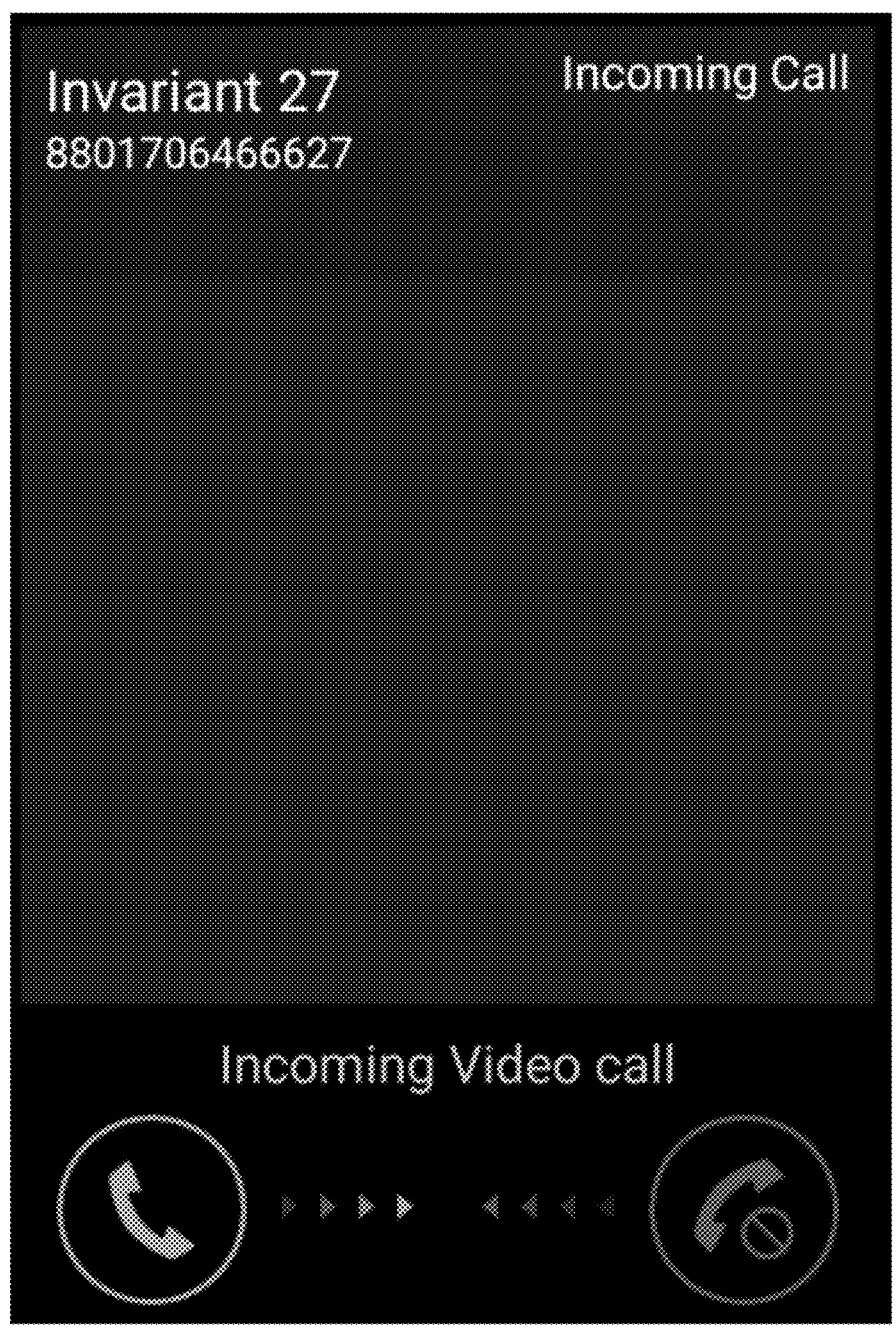
FIG. 7 is a screenshot illustrating an incoming call screen, according to an embodiment of the present invention.

FIG. 6 is a flowchart 600 illustrating a process for receiving an incoming call, according to an embodiment of the present invention. When an incoming call arrives at 605, a flag notifies the application whether the incoming call is an audio call 610 or a video call 630. An incoming call screen, such as incoming call screen 700 of FIG. 7, is displayed to the user, and the user takes the action of either accepting or rejecting the audio or video call at 615 or 635, respectively. If the user rejects the call, the call is terminated. If the user accepts the audio or video call, appropriate actions are taken. For instance, for audio calls, a timer is started and the speaker is set to off at 620. For video calls, the timer is started, the speaker is turned on, and the camera is turned on at 640. The incoming call is then connected at 625.

FIG. 7 is a screenshot illustrating an incoming call screen 700, according to an embodiment of the present invention. In incoming call screen, the user can see the username and phone number of the caller, as well as that this is an incoming video call. The user may then choose whether to accept or reject the call.

Figure 8:
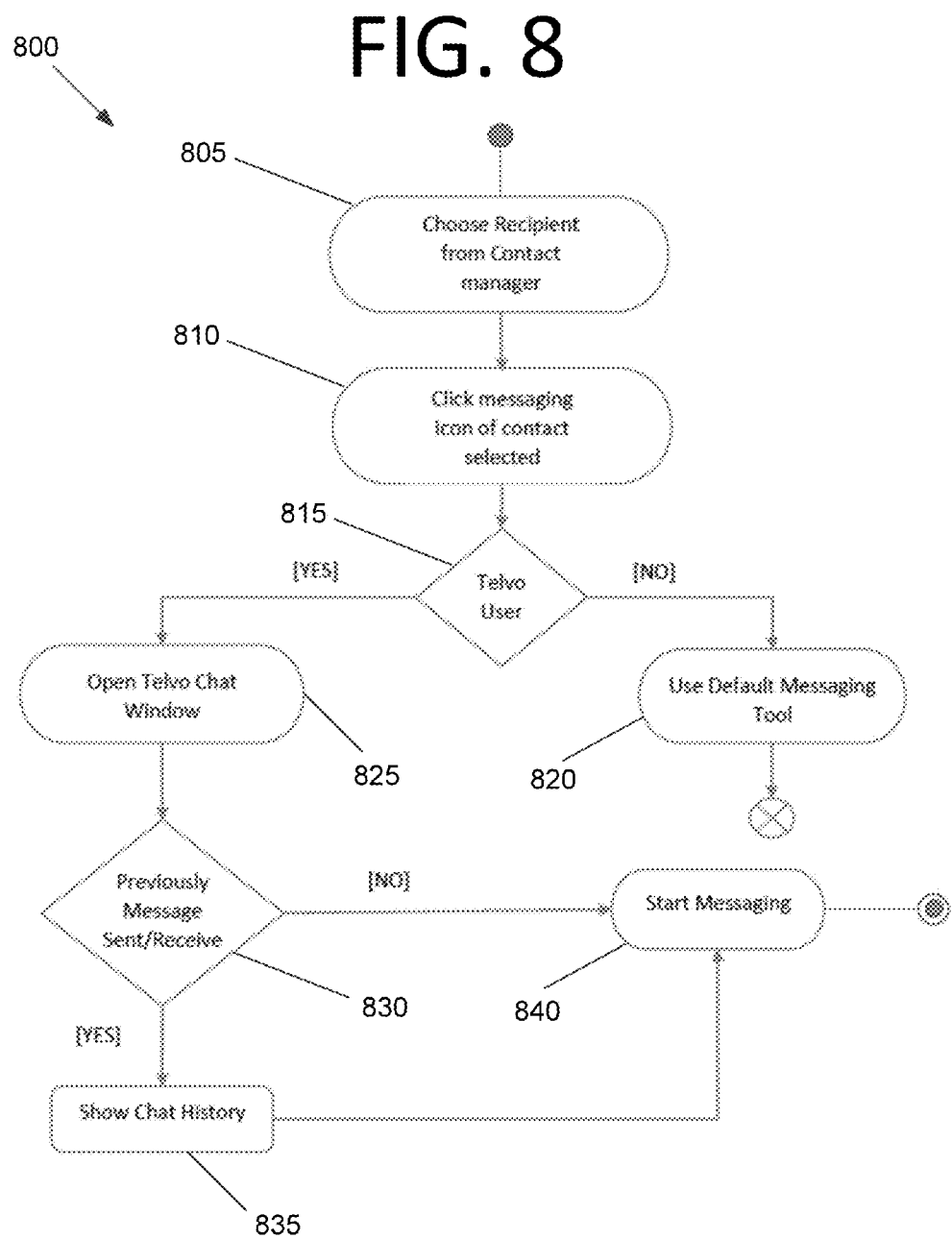
FIG. 8 is a flowchart illustrating a process for sending a message, according to an embodiment of the present invention.

FIG. 8 is a flowchart 800 illustrating a process for sending a message, according to an embodiment of the present invention. To send a message, the user first chooses a recipient from a contact manager at 805, and then clicks/taps on the messaging icon of the selected contact at 810. If the recipient is not a registered Telvo™ user at 815, the default messaging application is launched at 820.

However, if the recipient is a registered Telvo™ user at 815, the Telvo™ chat screen is launched at 825. See, for example, chat screen 900 of FIG. 9. If any message was previously sent or received at 830, the Telvo™ chat screen will display the chat history at 835 in this embodiment. The user is then presented with a text box to write a new text message at 840 to start messaging.

Figure 9:
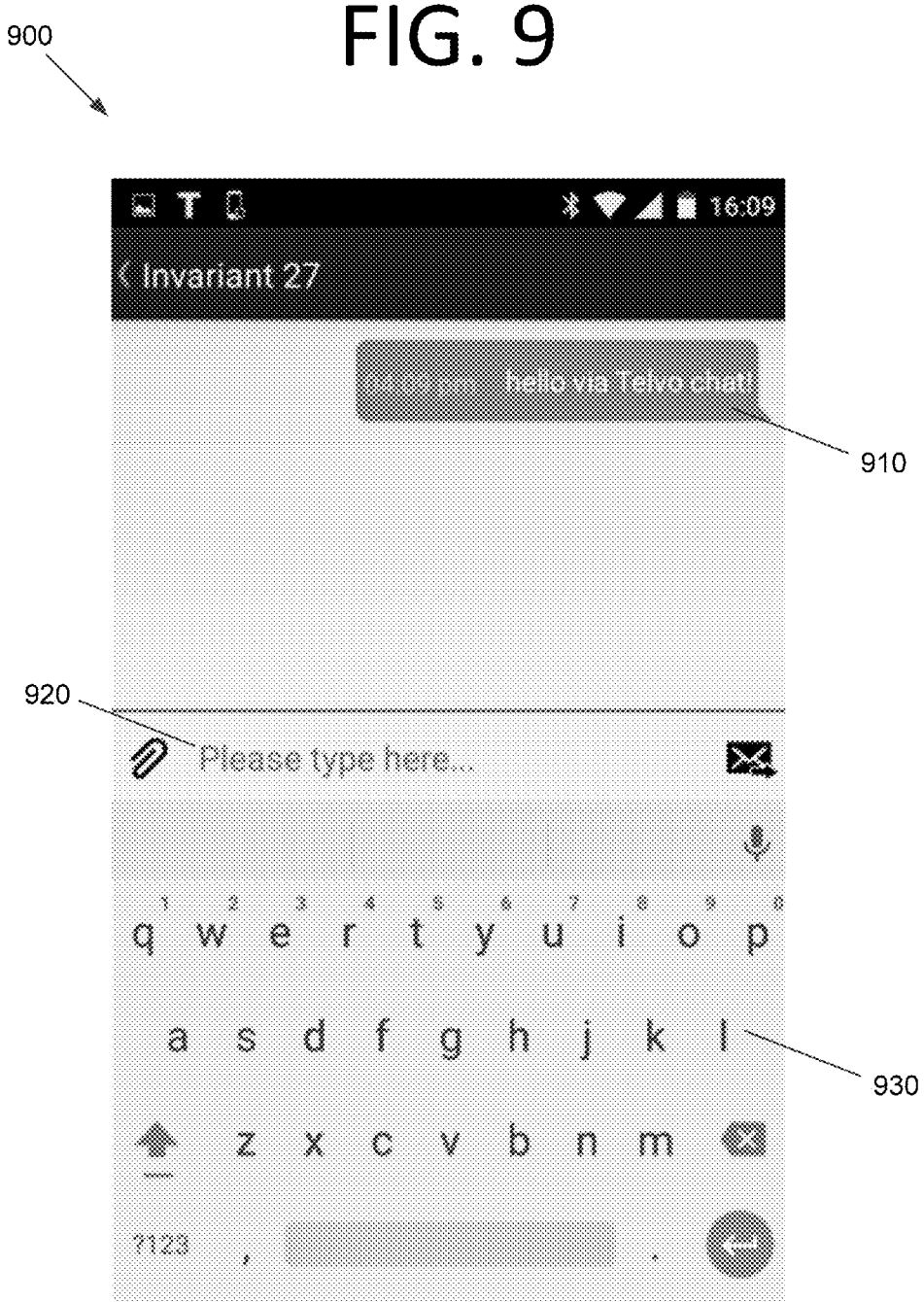
FIG. 9 is a screenshot illustrating a chat screen, according to an embodiment of the present invention.

FIG. 9 is a screenshot 900 illustrating a chat screen, according to an embodiment of the present invention. For chat with user Invariant 27, a chat history 910 is shown in the upper portion of chat screen 910. The user may enter text in text entry area 920, and a keypad 930 allows the user to select characters to type.

Figure 10:
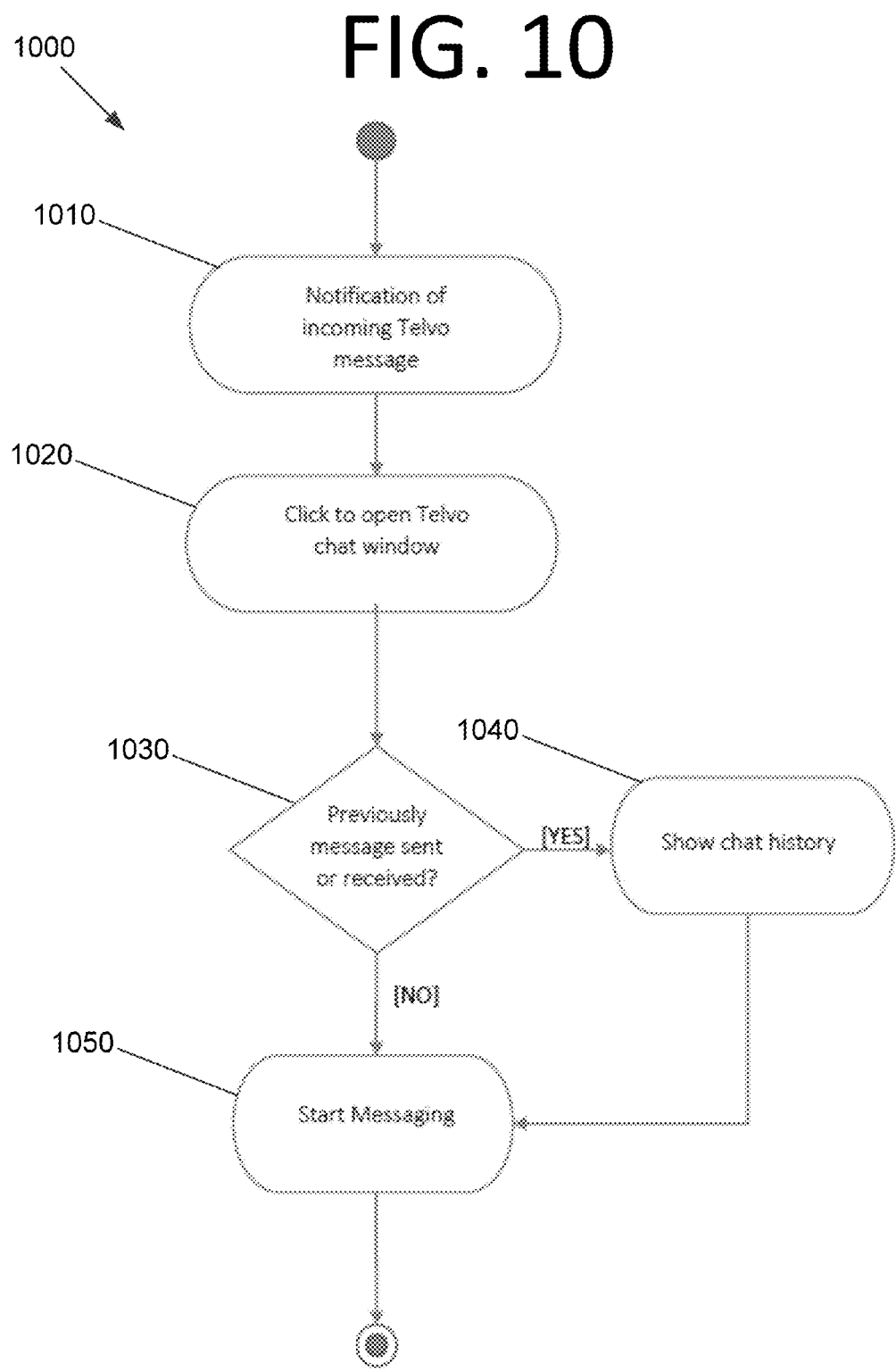
FIG. 10 is a flowchart illustrating a process for receiving a message, according to an embodiment of the present invention.

FIG. 10 is a flowchart 1000 illustrating a process for receiving a message, according to an embodiment of the present invention. When a message is received through Telvo™ at 1010, a notification will appear on the top notification panel of the phone. Tapping on the Telvo™ notification icon at 1020 will open the Telvo™ chat screen. See for example, chat screen 1100 of FIG. 11. If previously sent and/or received chat messages exist at 1030, the Telvo™ chat screen will display the chat messages exchanged with that user at 1040, with the latest message on top. The user is then presented with a text box to enter a new text message at 1050.

Figure 11:
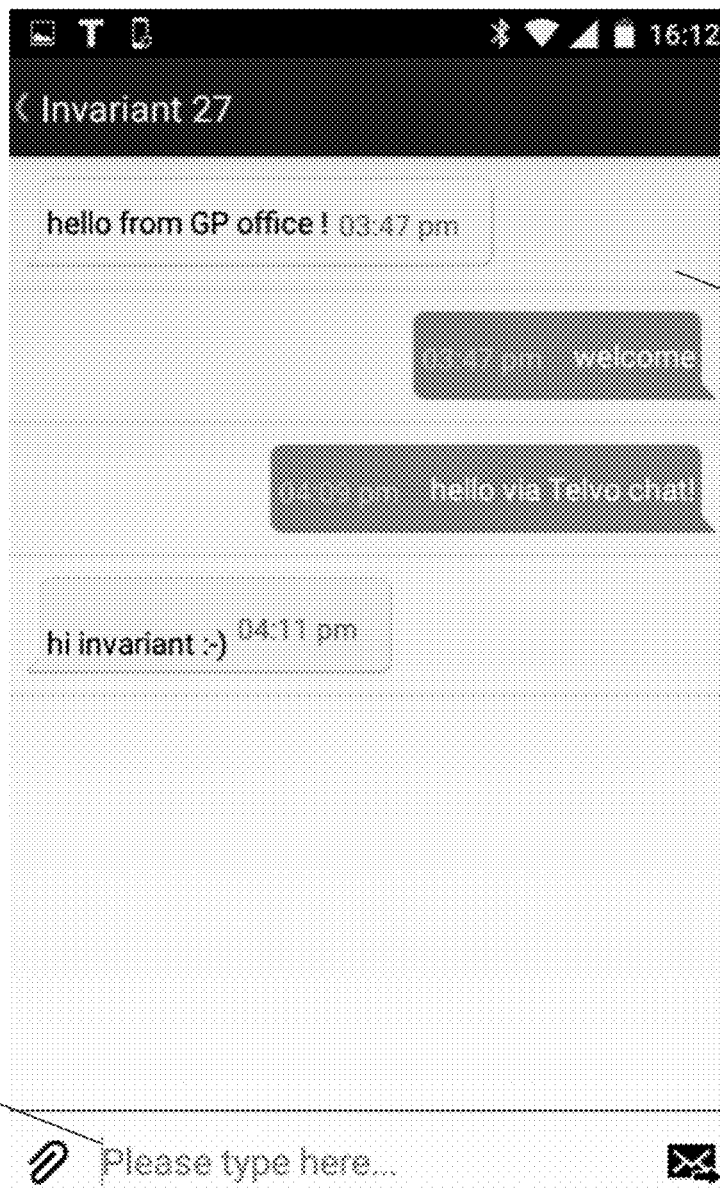
FIG. 11 is a screenshot illustrating a chat screen, according to an embodiment of the present invention.

FIG. 11 is a screenshot 1100 illustrating a chat screen, according to an embodiment of the present invention. Chat screen 1100 indicates that the chat is with the user, who is saved as "Invariant 27" in the contacts tab. A chat history 1110 is shown in the upper portion of chat screen 1110. The user may enter text in text entry area 1220.

Figure 12:
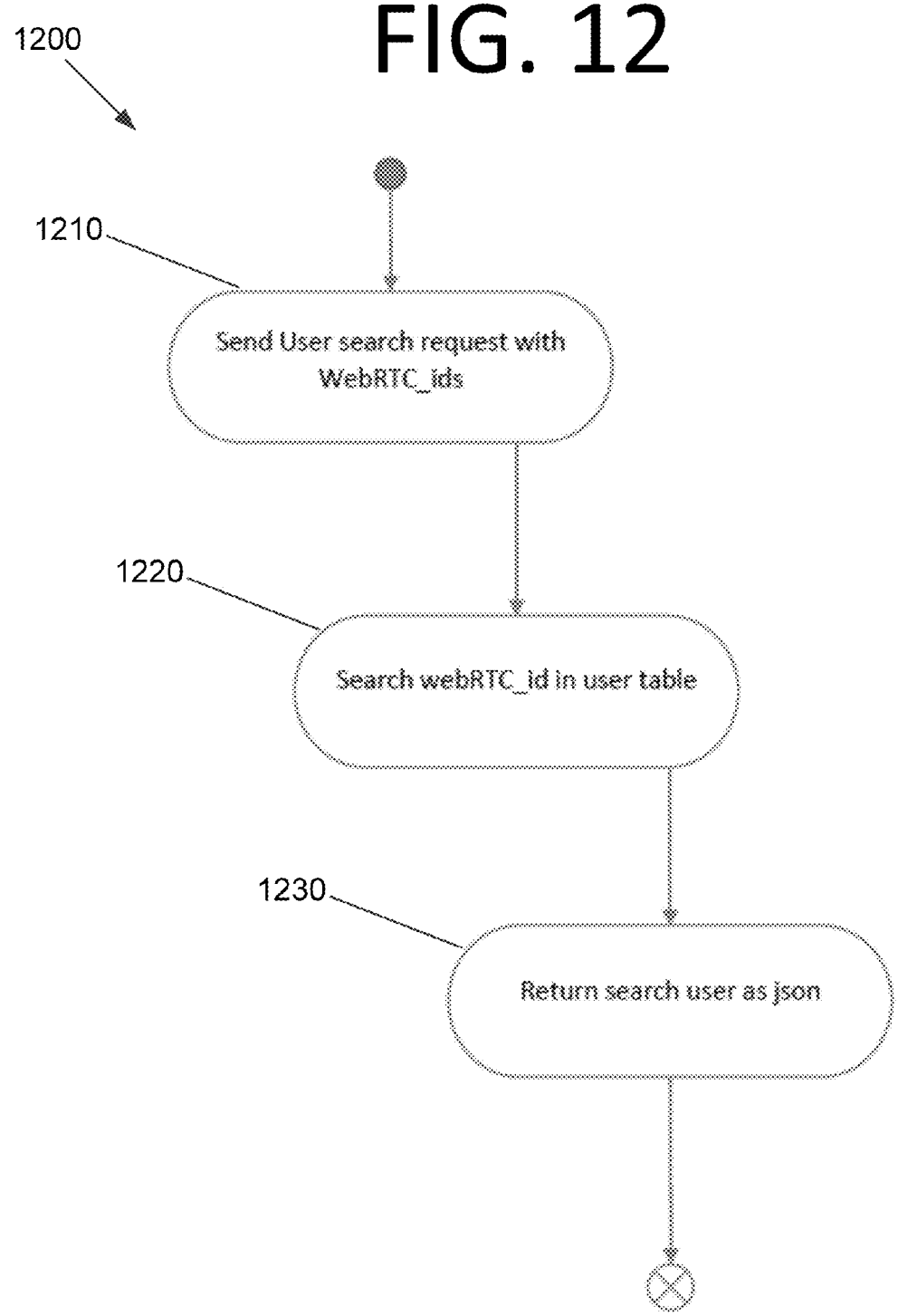
FIG. 12 is a flowchart illustrating a process for performing a server-side user search, according to an embodiment of the present invention.

FIG. 12 is a flowchart 1200 illustrating a process for performing a server-side user search, according to an embodiment of the present invention. When a call is initiated on the client side, the application checks whether the recipient user is also a registered user of the application. The client device sends a user search request to the back-end server at 1210 with the recipient phone number. The server matches the phone number against the corresponding webRTC_id, which identifies a user device. A query is performed on the database to retrieve the user info with the same webRTC_id at 1220. The server then sends back the user info to the requesting client device in JSON (JavaScript Object Notation) format at 1230 indicating whether the user was found. However, any other suitable protocol or format for communicating with the user's mobile device may be used without deviating from the scope of the invention.

Figure 13:
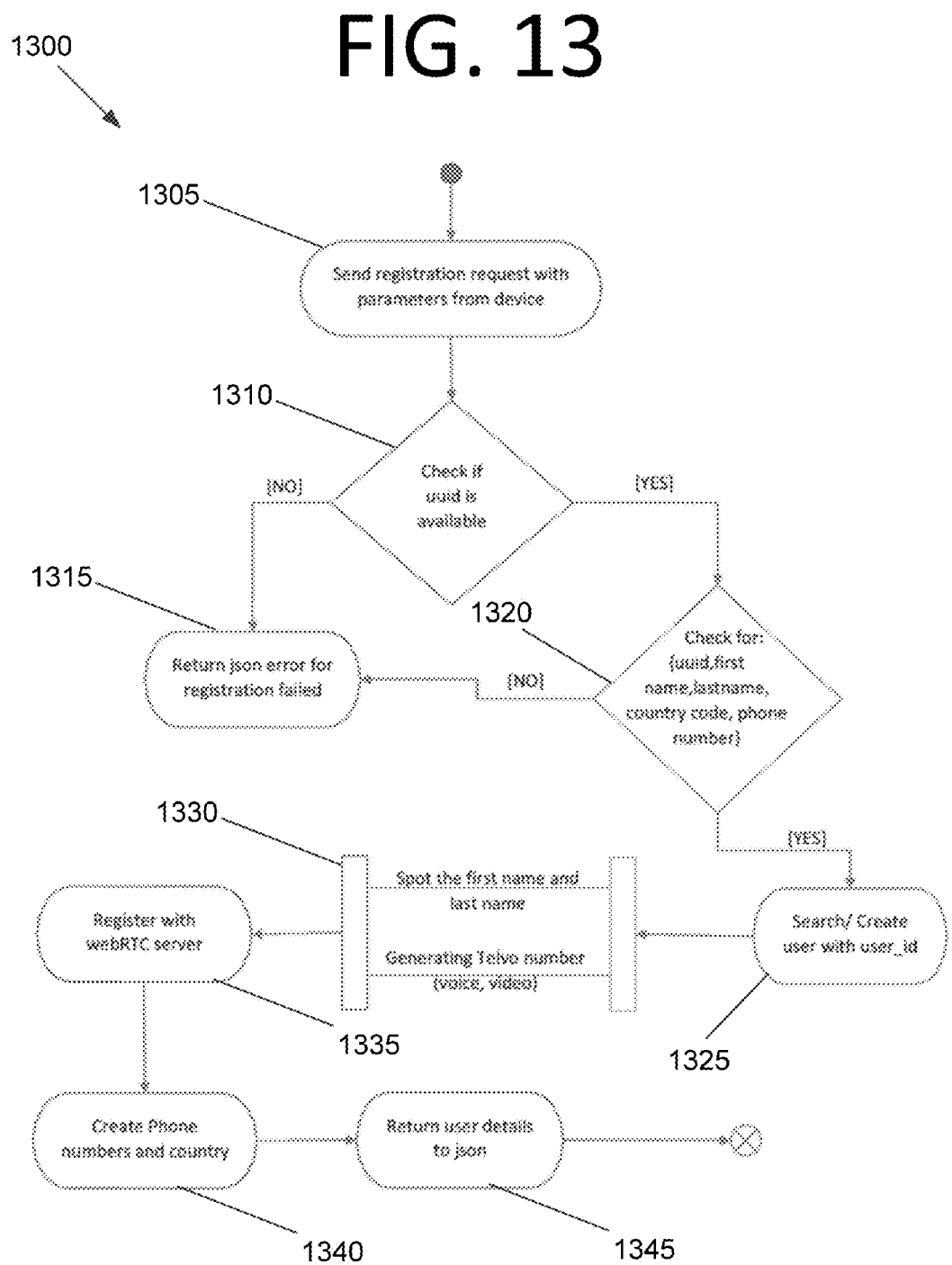
FIG. 13 is a flowchart illustrating a process for server-side user registration, according to an embodiment of the present invention.

FIG. 13 is a flowchart 1300 illustrating a process for server-side user registration, according to an embodiment of the present invention. When the application is first installed and launched, the user registers his or her phone number with the back-end servers. Once the user enters the phone number, the application sends a registration request with the phone number, the SIM IMSI, the SIM serial number, and a unique identifier for the device, such as the Android™ Unique Device ID (UDID) to the back-end server at 1305. The back-end server checks whether the UDID is available at 1310. If the UDID is not available, a JSON error for failed registration is returned at 1315. The back-end server then checks whether the UDID, first name, last name, country code, and phone number are already registered at 1320. If already registered, a JSON error for failed registration is returned at 1315.

If not already registered, then the back-end server will create a new user with a new user_id at 1325. If the first name and last name are available, they are extracted from the parameters of the registration request, and application-specific voice and video numbers are generated at 1330. The back-end server then registers the user_id with the webRTC server at 1335. The webRTC server generates a webRTC_id and GCM subscription_id and sends it back to the back-end servers. The back-end server will then create a new entry in the database with the phone numbers and country code, user_id, webRTC_id, the user's first and last name (if available), and other details at 1340. After registration is complete, the back-end server returns the user details back to the user's device in JSON format at 1345.

Figure 14:
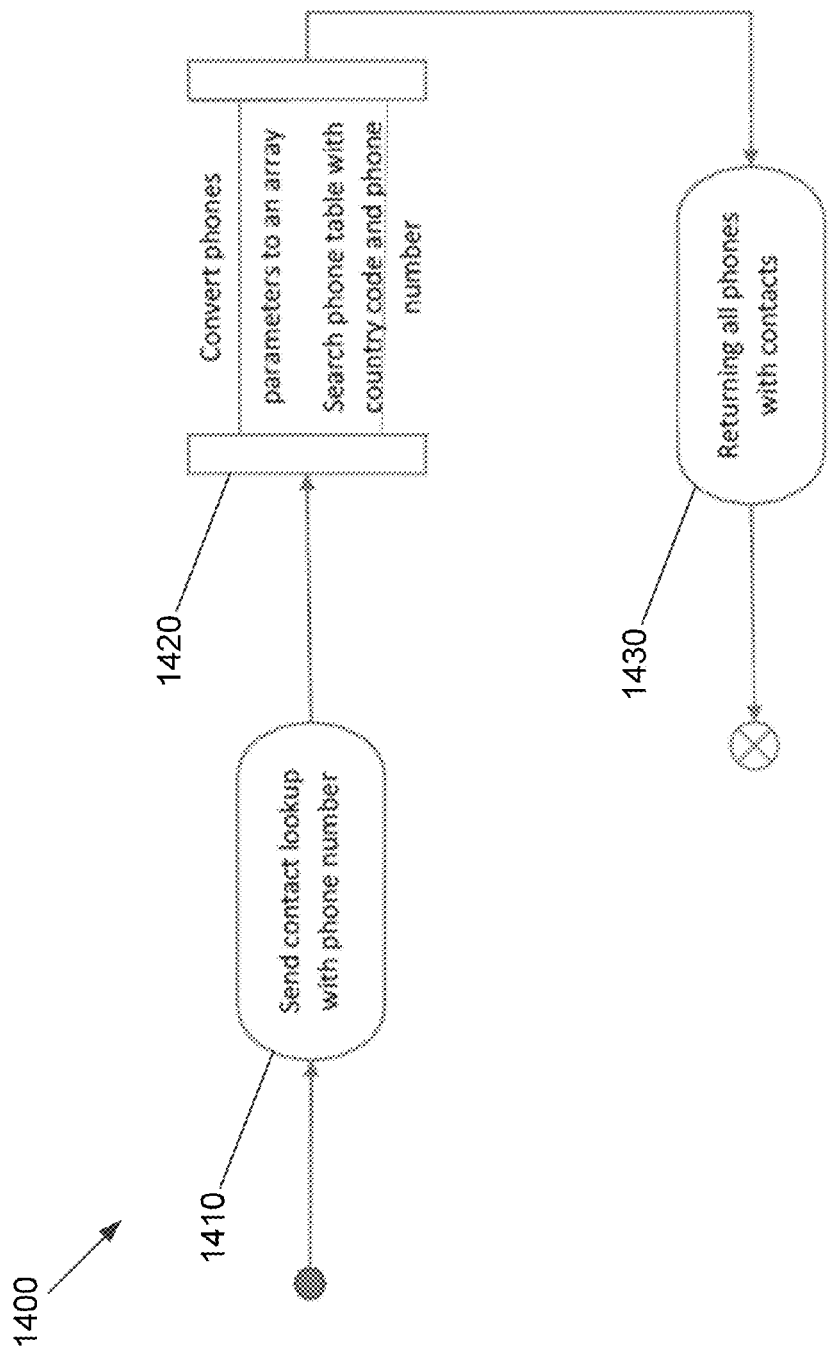
FIG. 14 is a flowchart illustrating a process for performing a server-side contacts lookup, according to an embodiment of the present invention.

FIG. 14 is a flowchart 1400 illustrating a process for performing a server-side contacts lookup, according to an embodiment of the present invention. The application, after installation, may periodically query the back-end server to find out which of the user's contacts in his or her contacts list are also registered users. This reduces the necessity to look up the database to find out if the recipient has the application every time the user makes a call. During the contact look up, the application may send all of the phone numbers of the user's contacts to the back-end server at 1410. The back-end server then searches the "phones" table in the database with the country code and the phone number for each contact at 1420. The back-end server then returns the phone numbers from the list that have the application installed at 1430.

Figure 15:
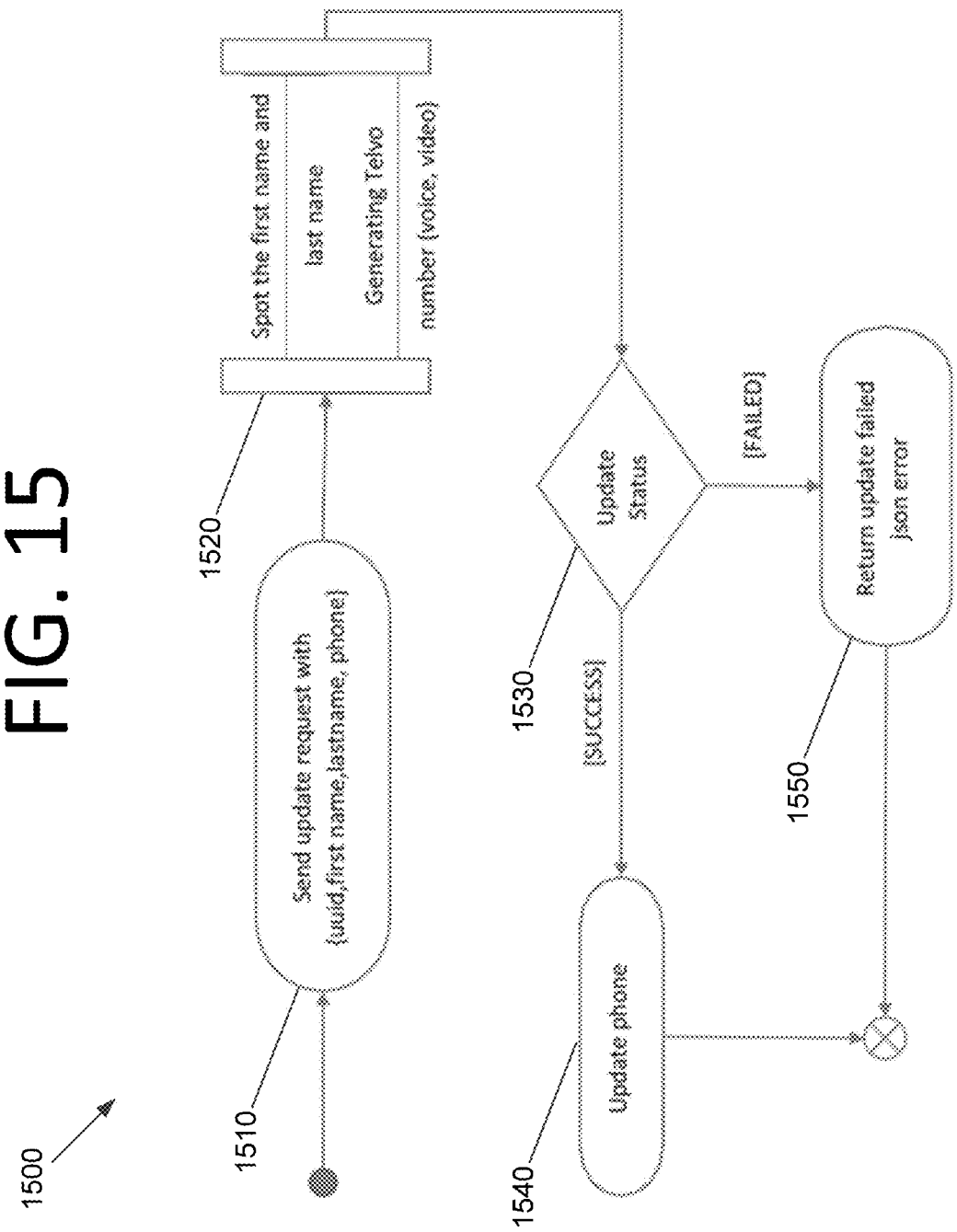
FIG. 15 is a flowchart illustrating a process for a server side update of user details, according to an embodiment of the present invention.

FIG. 15 is a flowchart 1500 illustrating a process for a server side update of user details, according to an embodiment of the present invention. An update request is sent from the client device with the UUID, first name, last name, and phone number of the user to the back-end server at 1510. The back-end server queries the database against the information received, and retrieves the user info at 1520. The user info is then updated accordingly and saved at 1530. If the update status is successful, the phone is updated at 1540. If the update failed, the server sends an update failed JSON error message back to the user device at 1550.

Figure 16:
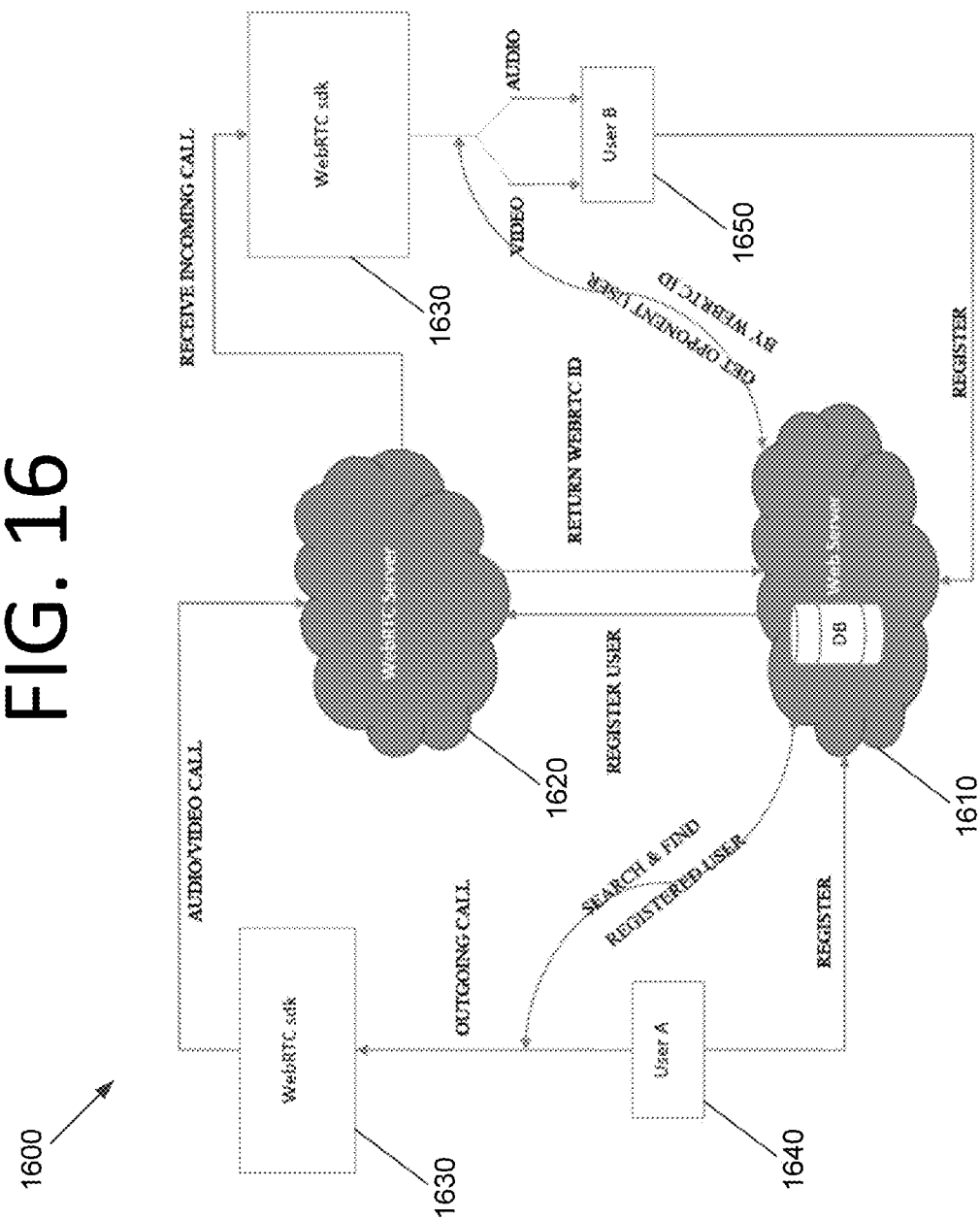
FIG. 16 is an architectural diagram illustrating the call architecture, according to an embodiment of the present invention.

FIG. 16 is an architectural diagram illustrating the call architecture 1600, according to an embodiment of the present invention. Call architecture 1600 includes three main components: (1) a web/back-end server 1610; (2) a WebRTC communication processing server 1620; and (3) a WebRTC Software Development Kit (SDK) 1630. During the registration process, the application sends the user data (e.g., user name, UDID, phone number, etc.) to web/back-end server 1610. Web/back-end server 1610 generates the appropriate IDs and tokens and registers the data with WebRTC server 1620.

When an outgoing call is being made, for instance, by mobile device 1640, the application calls the corresponding functions from WebRTC SDK 1630. WebRTC SDK 1630 handles the necessary logic to make an outgoing call. WebRTC SDK 1630 initiates the call process, and the call data is passed on to WebRTC Server 1620, which handles the networking and communication processing.

WebRTC Server 1620 then routes the call and call data to the appropriate recipient device, in this case, mobile device 1650, and the Android™ OS of the recipient device is notified via push notification. However, any other suitable operating system may be used without deviating from the scope of the invention. The Android™ OS in mobile device 1650 then calls the corresponding functions in WebRTC SDK 1620 contained in the application of mobile device 1650. The WebRTC SDK functions have a callback method that wakes up the application, if it was sleeping, with the assistance of WebRTC SDK 1630, and launches the incoming call user interface. The call is then connected.

Figure 17:
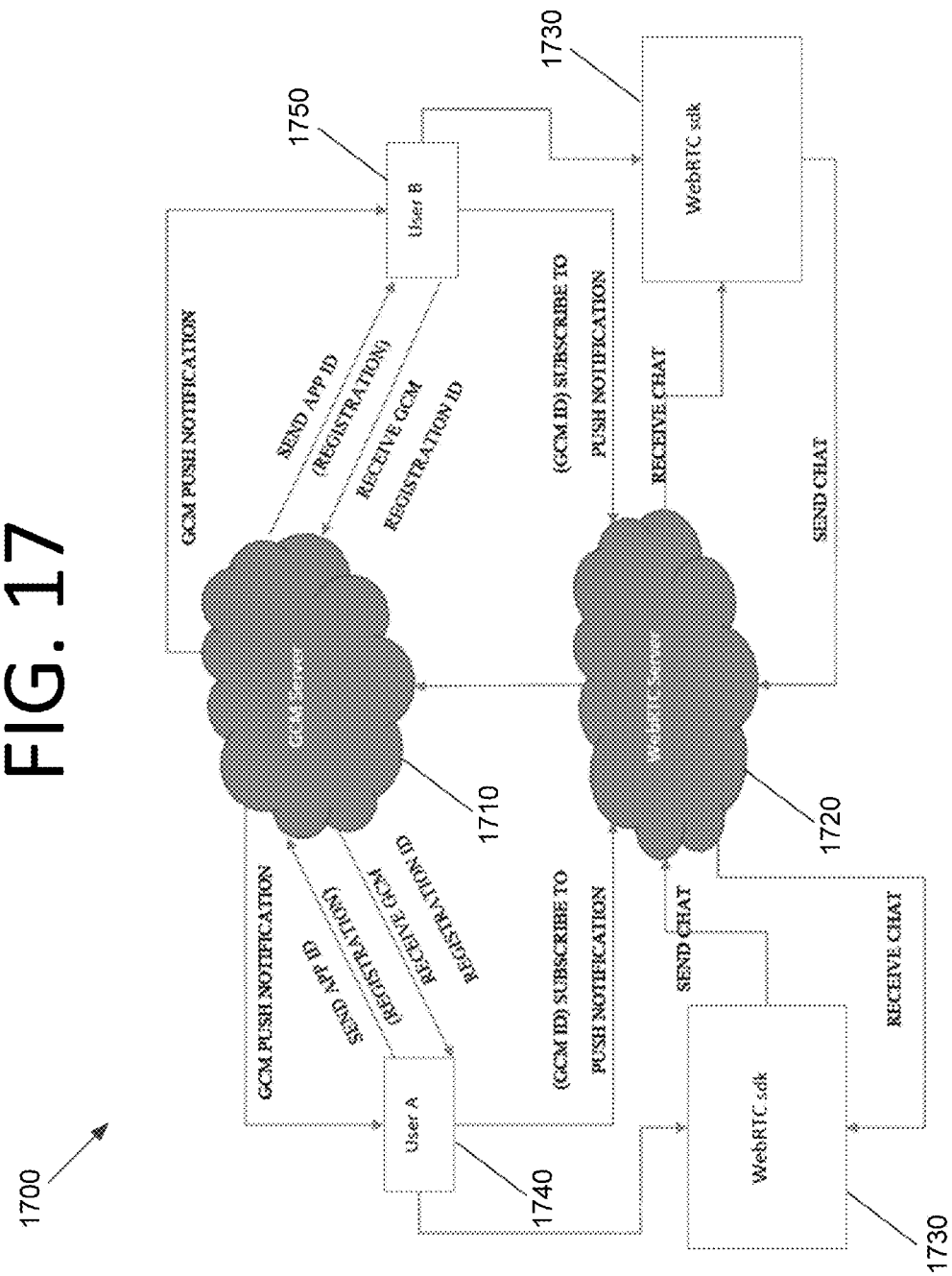
FIG. 17 is an architectural diagram illustrating an Instant Message (IM) architecture, according to an embodiment of the present invention.

FIG. 17 is an architectural diagram illustrating an Instant Message (IM) architecture 1700, according to an embodiment of the present invention. Similar to call architecture 1600 of FIG. 16, IM architecture 1700 also includes a WebRTC SDK 1730 and a WebRTC server 1720. In addition, a GCM (Google™ Cloud Messaging) server 1710, or servers, also plays a role in routing text messages in this embodiment. However, any suitable messaging server may be used without deviating from the scope of the invention.

During registration, the user is subscribed to the GCM service. The application on mobile device 1740 sends the application ID and the device ID to GCM server 1710 for registration, and GCM server 1710 responds by sending a registration ID back to the application. The application also sends the registration ID received from GCM server 1710 to WebRTC server 1720 during the registration process.

When a user wants to send a chat message to another user, e.g., from mobile device 1740 to mobile device 1750, WebRTC SDK 1730 will send the chat message to WebRTC server 1720. WebRTC server 1720 then sends the chat message to GCM server 1710. GCM server 1710 sends a push notification to receiving mobile device 1750 with the chat message and the appropriate headers to identify that is sent by WebRTC server 1720. This causes the application running on receiving mobile device 1750 to be activated and show the chat message to the recipient user.

Figure 18:
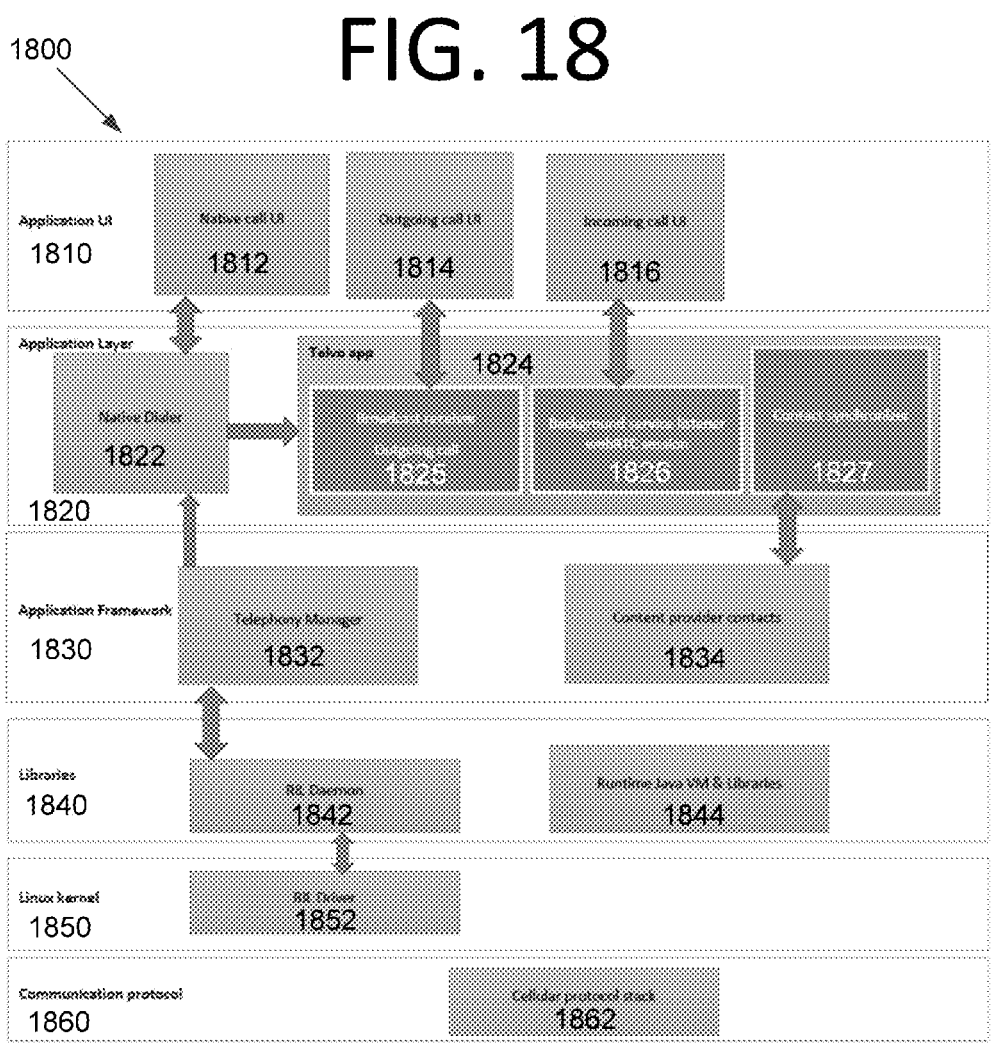
FIG. 18 is a block diagram illustrating the layers of the application stack, according to an embodiment of the present invention.

FIG. 18 is a block diagram illustrating layers 1800 used by the application, according to an embodiment of the present invention. Layers 1800 include a User Interface (UI) layer 1810, an application layer 1820, an application framework layer 1830, a libraries layer 1840, a Linux™ kernel layer 1850 (however, other operating systems may be used in other embodiments), and a communication protocol layer 1860. More specifically, FIG. 18 shows where the application sits within the mobile device in this embodiment. The native call UI 1812 is used to launch an outgoing call, whether it be an audio or a video call.

The bottom four layers 1830, 1840, 1850, 1860 represent the Operating System (OS), and include the modules required for the OS to operate within a mobile device, such as a cell phone or a tablet. Application framework layer 1830 is the primary layer that acts as a go-between between applications that have not been shipped with the default OS and OS layers 1840, 1850, 1860 beneath.

Application 1824 resides in application layer 1820, which sits just above application framework layer 1830. A default "contacts" application (not shown) and a native OS dialer 1822 are also "applications" as far as the OS is concerned, and they also reside in application layer 1820. Application 1824 includes three main modules: (1) a broadcast receiver 1825; (2) a background service listener 1826; and (3) a contact synchronizer 1827. Broadcast receiver 1825 intercepts outgoing calls when the user dials a phone number or selects a contact from the default contacts application. Background service listener 1826 listens for incoming call notifications and launches incoming call UI 1816 when a call is received. Contact synchronizer 1827 synchronizes the user's contacts with back-end servers and updates the contacts when changes are detected.

During installation, application 1824 may subscribe broadcast receiver 1825 to monitor that outgoing calls that are being made. When a user wants to make an outgoing call, the user may dial the number in the keypad or select the contact from the contact list. In both cases, a broadcast is sent by the OS. Broadcast receiver 1825 will intercept the call since it is registered to listen to the broadcast. Broadcast receiver 1825 checks whether the recipient user is also a registered user of application 1824, and if so, will launch outgoing call UI 1814.

Similarly during installation, application 1824 may launch background service listener 1826 that listens to incoming notifications from WebRTC servers and GCM servers, for example. When an incoming notification arrives, background service listener 1826 may parse the notification and check whether the notification is for an incoming call, for an incoming message, for another purpose. If the notification is for an incoming call, incoming call UI 1816 of application 1824 is launched. If the notification is for an incoming chat message, a notification is displayed to the user indicating that an unread message is waiting to be read.

Content providers are interfaces to read and write information that is stored in the mobile device's local database. The user's contact data is also stored in one of a local database, and can be accessed using content provider contacts 1834. After installation, and periodically after that, contact synchronizer 1827 will read content provider contacts 1834 to get the user's contact names and their phone numbers. Detected changes may then be sent to the back-end servers for update.

Native dialer 1822 is a module in the application that is responsible for making calls. Calls can be in two forms: (1) a regular GSM call; or (2) a VoIP call. For regular GSM calling, when the user selects a phone number that is not a registered Telvo™ number, the application will make a regular GSM call to that number. The target phone number is sent to telephone manager 1832 with the correct parameters to initiate the call. The session is then handed back over to the default calling UI of the Android™ OS's and the application goes back to its previous state. The entire process may happen silently so that the user does not require any input, and in most cases, the user will not notice anything. Telephony manager 1832 then uses the Android™ OS libraries, such as RIL daemon 1842, which, in turn, uses RIL driver 1852 of Linux™ kernel 1850 to complete the outgoing call.

For VoIP calls, if the selected number is also a registered Telvo™ number, the call will be in the form of a VoIP call and the communication happen over the data network instead of the regular GSM cellular network. The appropriate headers and parameters are passed to telephony manager 1832 to establish a web socket connection between the two devices so that the audio and the video call data can be exchanged between the two devices over the IP network. The audio and the video of the call is encoded as bits of data and passed along as a continuous stream to keep the flow in real time in some embodiments. Telephony manager 1832 uses the appropriate libraries from Linux™ kernel 1850 to send data to and from the connected device. This is how the VoIP call is achieved in some embodiments.

Figure 19:
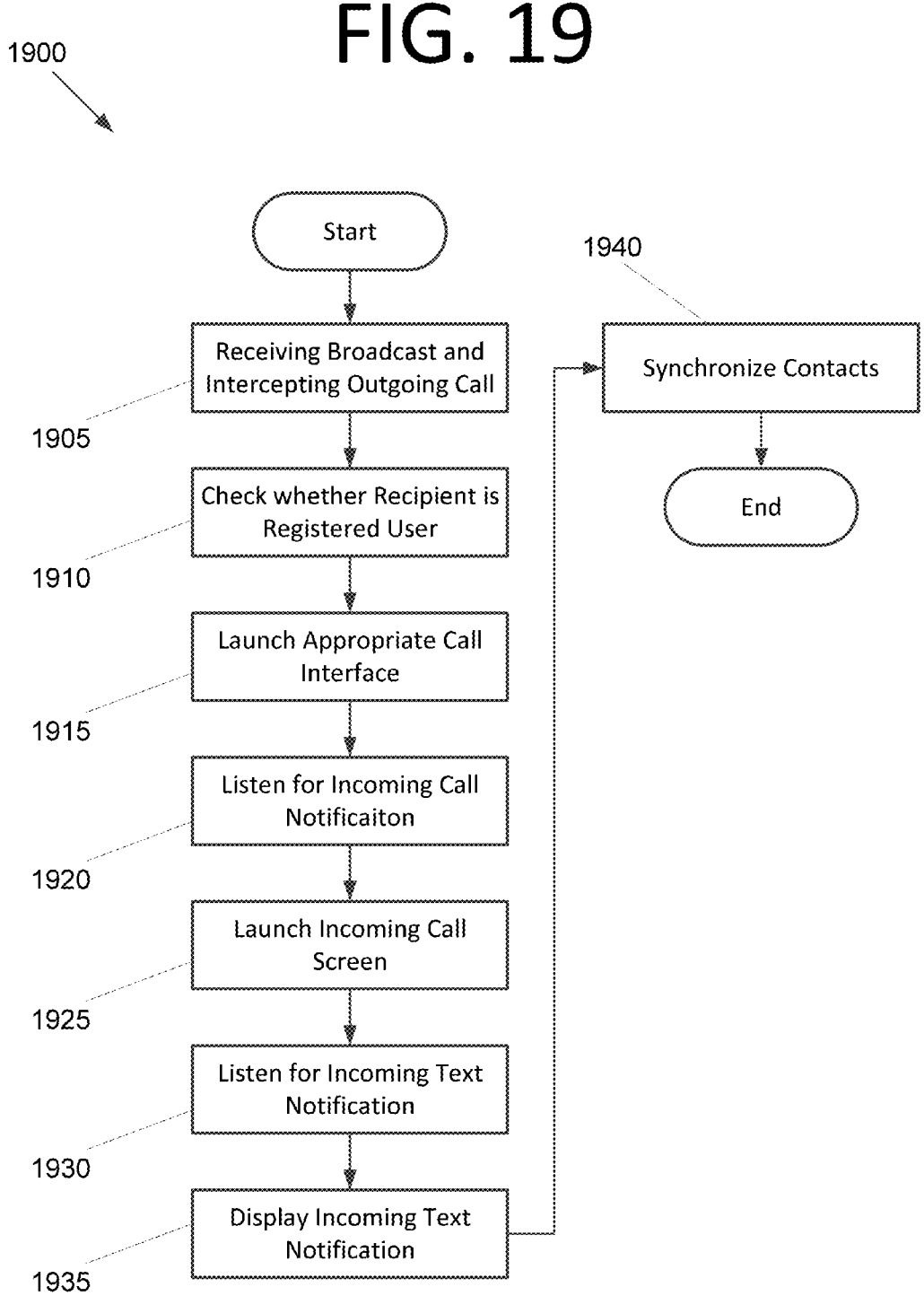
FIG. 19 is a flowchart illustrating a process for sending and receiving calls and receiving text, according to an embodiment of the present invention.

FIG. 19 is a flowchart 1900 illustrating a process for sending and receiving calls and receiving text, according to an embodiment of the present invention. The process begins with an application receiving a broadcast from an operating system of a mobile phone indicating that an outgoing call is being made and intercepting the outgoing call at 1905. The application then checks whether a recipient of the outgoing call is a registered user of an application associated with the broadcast receiver at 1910. In some embodiments, the checking of whether the recipient is registered may include checking first on the mobile device whether the recipient is a registered user of the application and when the recipient is not indicated on the mobile device to be a registered user of the application, checking with one or more servers whether the recipient is a registered user of the application. The application then launches an outgoing call user interface of the application when the recipient is a registered user of the application, and launches a native call user interface of the mobile device when the recipient is not a registered user of the application, at 1915.

The application listens for an incoming call notification from one or more servers indicating that the incoming call is from a registered user of the application at 1920. The application also launches an incoming call user interface of the application when the incoming call notification is received at 1925. The application listens for an incoming text notification from the one or more servers indicating that the incoming text is from a registered user of the application at 1930 and displays a notification on the mobile device indicating that the text has been received at 1935.

The application synchronizes contacts at 1940. Synchronization of contacts may be performed periodically and/or when a change to the contacts is detected. Furthermore, the application may listen for when changes to the user's contacts are made.

Figure 20:
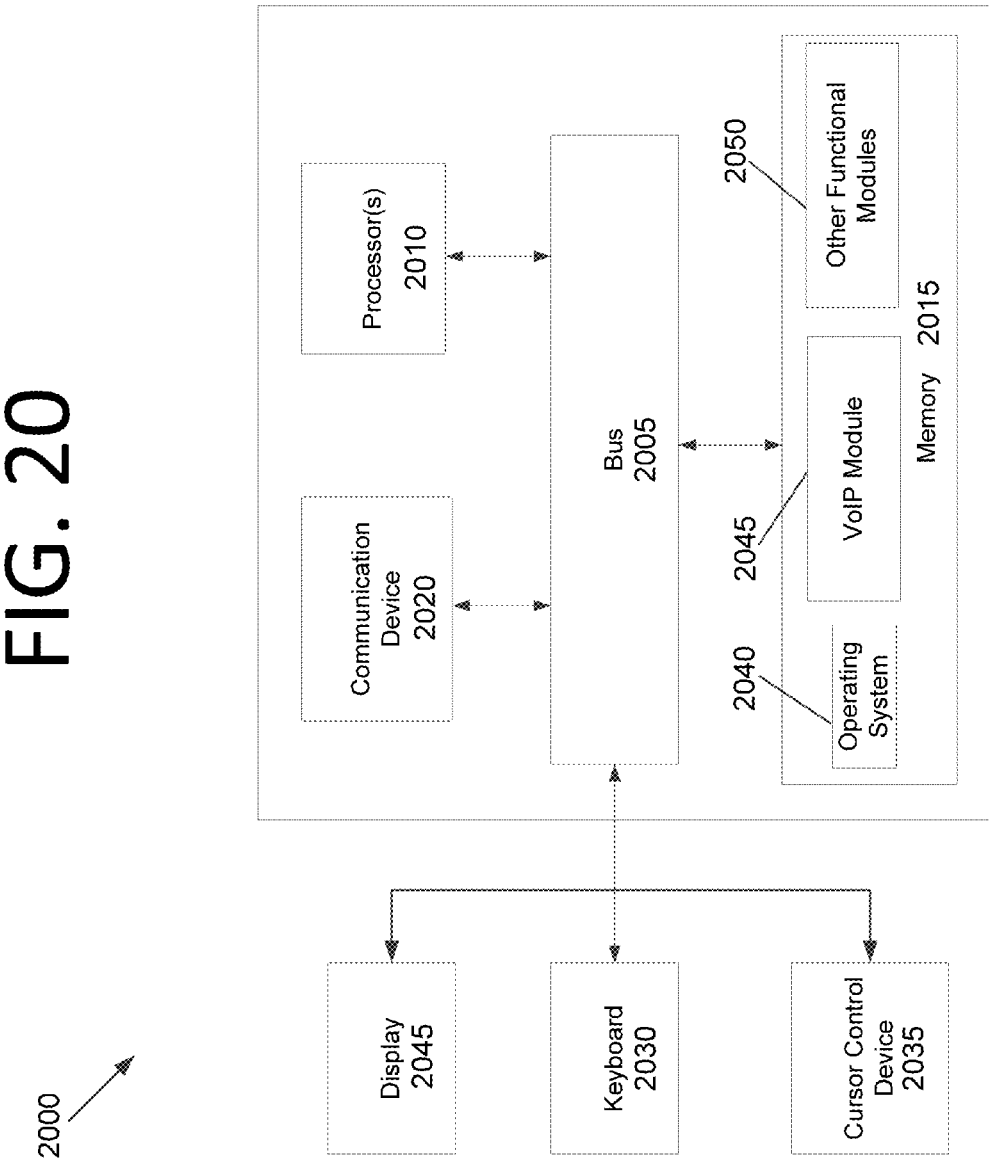
FIG. 20 is a block diagram of a computing system configured to provide VoIP functionality, according to an embodiment of the present invention.

FIG. 20 is a block diagram of a computing system 2000 configured to provide VoIP functionality, according to an embodiment of the present invention. Computing system 2000 includes a bus 2005 or other communication mechanism for communicating information, and processor(s) 2010 coupled to bus 2005 for processing information. Processor(s) 2010 may be any type of general or specific purpose processor, including a central processing unit ("CPU") or application specific integrated circuit ("ASIC"). Processor(s) 2010 may also have multiple processing cores, and at least some of the cores may be configured to perform specific functions. Computing system 2000 further includes a memory 2015 for storing information and instructions to be executed by processor(s) 2010. Memory 2015 can be comprised of any combination of random access memory ("RAM"), read only memory ("ROM"), flash memory, cache, static storage such as a magnetic or optical disk, or any other types of non-transitory computer-readable media or combinations thereof. Additionally, computing system 2000 includes a communication device 2020, such as a transceiver, to wirelessly provide access to a communications network.

Non-transitory computer-readable media may be any available media that can be accessed by processor(s) 2010 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 2010 are further coupled via bus 2005 to a display 2025, such as a Liquid Crystal Display ("LCD"), for displaying information to a user. A keyboard 2030 and a cursor control device 2035, such as a computer mouse, are further coupled to bus 2005 to enable a user to interface with computing system 2000. However, in certain embodiments such as those for mobile computing implementations, a physical keyboard and mouse may not be present, and the user may interact with the device solely through display 2025 and/or a touchpad (not shown). Any type and combination of input devices may be used as a matter of design choice.

In one embodiment, memory 2015 stores software modules that provide functionality when executed by processor(s) 2010. The modules include an operating system 2040 for computing system 2000. The modules further include a VoIP module 2045 that is configured to perform the various operations disclosed herein pertaining to VoIP and cellular network calls and texting. Computing system 2000 may include one or more additional functional modules 2050 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIGS. 2, 4, 6, 8, 10, 12-15, and 19 may be performed by a computer program, encoding instructions for the nonlinear adaptive processor to perform at least the methods described in FIGS. 2, 4, 6, 8, 10, 12-15, and 19, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 2, 4, 6, 8, 10, 12-15, and 19, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus comprising:
memory storing computer program instructions for a broadcast receiver and a background service listener; and
at least one processor configured to execute the computer program instructions, wherein the broadcast receiver is configured to cause the at least one processor to:
receive a broadcast from an operating system of the apparatus indicating that an outgoing call is being made,
intercept the outgoing call,
check whether a recipient of the outgoing call is a registered user of an application associated with the broadcast receiver,
launch an outgoing call user interface of the application when the recipient is a registered user of the application, and
launch a native call user interface of the mobile device when the recipient is not a registered user of the application, and
the background service listener is configured to cause the at least one processor to:
listen for an incoming call notification from one or more servers indicating that the incoming call is from a registered user of the application, and
launch an incoming call user interface of the application when the incoming call notification is received, wherein
the checking of whether the recipient of the outgoing call is a registered user of the application comprises:
checking first on the mobile device whether the recipient is a registered user of the application; and
when the recipient is not indicated on the mobile device to be a registered user of the application, checking with one or more servers whether the recipient is a registered user of the application.

2. The apparatus of claim 1, wherein the memory further stores computer program instructions for a contact synchronizer, the contact synchronizer configured to cause the at least one processor to periodically synchronize contacts of the user with a server.

3. The apparatus of claim 2, wherein the contact synchronizer is further configured to cause the at least one processor to synchronize the contacts of the user with the server when a change to the contacts on the apparatus is detected by the contact synchronizer.

4. The apparatus of claim 3, wherein the contact synchronizer is further configured to cause the at least one processor to listen for when changes to the user's contacts are made.

5. The apparatus of claim 1, wherein an application associated with the broadcast receiver is configured to cause the at least one processor to subscribe the broadcast receiver to monitor whether outgoing calls are being made.

6. The apparatus of claim 1, wherein the background service listener is further configured to cause the at least one processor to:
listen for an incoming text notification from the one or more servers indicating that the incoming text is from a registered user of the application, and
display a notification on the mobile device indicating that the text has been received.

7. A computer-implemented method, comprising:
receiving, by a software application running on a mobile device, a broadcast from an operating system of the mobile device indicating that an outgoing call is being made;
intercepting the outgoing call, by the application;
checking, by the application, whether a recipient of the outgoing call is a registered user of the application; and
launching an application outgoing call user interface, by the application, when the recipient is a registered user of the application, wherein
the checking of whether the recipient of the outgoing call is a registered user of the application comprises:
checking first on the mobile device whether the recipient is a registered user of the application; and
when the recipient is not indicated on the mobile device to be a registered user of the application, checking with one or more servers whether the recipient is a registered user of the application.

8. The computer-implemented method of claim 7, further comprising:
launching a native call user interface of the mobile device, by the application, when the recipient is not a registered user of the application.

9. The computer-implemented method of claim 7, further comprising:
listening, by the application, for an incoming call notification from one or more servers indicating that the incoming call is from a registered user of the application; and
launching, by the application, an incoming call user interface of the application when the incoming call notification is received.

10. The computer-implemented method of claim 7, further comprising:
periodically synchronizing contacts of the user, by the application, with a server.

11. The computer-implemented method of claim 7, further comprising:
synchronizing the contacts of the user with the server, by the application, when a change to the contacts on the apparatus is detected by the contact synchronizer.

12. The computer-implemented method of claim 7, further comprising:
listening, by the application, for when changes to the user's contacts are made.

13. The computer-implemented method of claim 7, further comprising:
listening, by the application, for an incoming text notification from the one or more servers indicating that the incoming text is from a registered user of the application; and
displaying a notification on the mobile device, by the application, indicating that the text has been received.

14. A computer program embodied on a non-transitory computer-readable medium, the program configured to cause at least one processor to:
intercept an outgoing call responsive to a broadcast from an operating system of a mobile device indicating that the outgoing call is being made;
check whether a recipient of the outgoing call is a registered user of an application by checking first on the mobile device whether the recipient is a registered user of the application, and when the recipient is not indicated on the mobile device to be a registered user of the application, checking with one or more servers whether the recipient is a registered user of the application; and
launch an outgoing call user interface of the application when the recipient is a registered user of the application.

15. The computer program of claim 14, wherein the program is further configured to cause the at least one processor to:
  launch a native call user interface of the mobile device when the recipient is not a registered user of the application.

16. The computer program of claim 14, wherein the program is further configured to cause the at least one processor to:
  listening for an incoming call notification from one or more servers indicating that the incoming call is from a registered user of the application; and
  launch an incoming call user interface of the application when the incoming call notification is received.

17. The computer program of claim 14, wherein the program is further configured to cause the at least one processor to:
  listen for an incoming text notification from the one or more servers indicating that the incoming text is from a registered user of the application; and
  display a notification on the mobile device indicating that the text has been received.

\* \* \* \* \*